United States Patent
Lu

(10) Patent No.: US 7,142,376 B2
(45) Date of Patent: Nov. 28, 2006

(54) LIGHT APPARATUS OF AN OPTICAL MOUSE WITH AN APERTURE STOP AND THE LIGHT PROJECTION METHOD THEREOF

(75) Inventor: Shu-Feng Lu, Taipei (TW)

(73) Assignee: Pacer Technology Co., Ltd., Taipei (TW)

( * ) Notice: Subject to any disclaimer, the term of this patent is extended or adjusted under 35 U.S.C. 154(b) by 0 days.

(21) Appl. No.: 11/091,438

(22) Filed: Mar. 29, 2005

(65) Prior Publication Data

US 2006/0176581 A1 Aug. 10, 2006

(30) Foreign Application Priority Data

Feb. 4, 2005 (TW) .............................. 94103660 A

(51) Int. Cl.
*G02B 9/00* (2006.01)
*G02B 9/08* (2006.01)
*G08G 5/08* (2006.01)

(52) U.S. Cl. ...................... 359/739; 345/163

(58) Field of Classification Search ........ 359/738–740; 345/163, 165–166
See application file for complete search history.

(56) References Cited

U.S. PATENT DOCUMENTS

| 6,256,016 | B1 * | 7/2001 | Piot et al. ................... 345/166 |
| 6,967,321 | B1 * | 11/2005 | Leong et al. ............... 345/166 |
| 2005/0253058 | A1 * | 11/2005 | Leong et al. ............... 250/239 |

* cited by examiner

*Primary Examiner*—Alicia M Harrington
(74) *Attorney, Agent, or Firm*—Rosenberg, Klein & Lee

(57) ABSTRACT

A light apparatus of an optical mouse with an aperture stop and the light projection method thereof are described. The light apparatus has at least one image-forming lens and an aperture stop. The image-forming lens defines an interior area and an external area. The aperture stop has a pupil. The aperture stop shelters the external area of the image-forming lens. The pupil of the aperture stop corresponds to the interior area. The present light apparatus will not produce a light halo on the image detection unit of the optical mouse when the light source of the optical mouse projects a light that passes through the image-forming lens of the light apparatus. Therefore, the image detection unit clearly detects the image of the image detection surface.

15 Claims, 6 Drawing Sheets

LIGHT APPARATUS OF AN OPTICAL MOUSE WITH AN APERTURE STOP AND THE LIGHT PROJECTION METHOD THEREOF

BACKGROUND OF THE INVENTION

1. Field of the Invention

The present invention relates to a light apparatus of an optical mouse and the light projection method. In particular, this invention provides a light apparatus of an optical mouse with an aperture stop and the light projection method thereof.

2. Description of the Related Art

An optical mouse detects the image on the image detection surface by using an image detection unit and moves the cursor displayed on a display unit. The sensitivity of the movement of the cursor depends on whether the image detection unit detects clearly the image on the image detection surface or not.

Reference is made to FIG. 1. The optical mouse of the prior art comprises a light apparatus 1, a light source 2 and an image detection unit 3. The light apparatus comprises a light-guiding body 10 and an image-forming lens 11. When an optical mouse is moved on an image detection surface 5, the light of the light source is projected onto the image detection surface 5. The light is reflected from the image detection surface 5 and passes through the image-forming lens 11 to the image detection unit 3. In this way, the image detection unit 3 detects the image on the image detection surface 5. The image detected from the image detection unit 3 is calculated and processed by a circuit unit (not showed on the figure) to judge the direction and the displacement of the optical mouse's movement and move the cursor on a display unit.

When the light of the light source 2 passes through the image-forming lens 11, the light apparatus 1 of the optical mouse of the prior art produces a light halo (also called haze) on the image detection unit 3 of the optical mouse due to aberration, as shown in FIG. 2. The two ends of the image detected on the image detection unit 3 are curved and vague, due to the curvature of the image-forming lens 11. As a result, the image detection unit 3 can't clearly detect the image of the image detection surface 5. Therefore, the cursor on the display unit can't be moved sensitively.

If an aperture stop 15 is made integrally in one piece with an image detection unit 3, the cursor on the display unit can be moved sensitively, as illustrated in FIG. 1A. However, the above image detection unit 3 only operates with an image-forming lens 11 having a sole type of curvature to enhance the detection effect. When the curvature of the image-forming lens 11 is different, the distance between the image detection unit 3 and the image-forming lens 11 needs to be changed and the dimension and the installation position of the aperture stop 15 also need to be changed in order to have a good detection effect. This will increase the manufacturing cost of the optical mouse.

SUMMARY OF THE INVENTION

The main object of the present invention is to provide a light apparatus of an optical mouse with an aperture stop and the light projection method thereof. The light projected from the light source of the optical mouse doesn't produce a light halo on the image detection unit of the optical mouse when the light passes through the image-forming lens of the light apparatus. This image detection unit can clearly detect the image of the image detection surface.

Another object of the present invention is to provide a light apparatus of an optical mouse with an aperture stop and the light projection method thereof. The present invention reduces the manufacturing cost.

In order to achieve the above object, the present invention provides a light projection method for a light apparatus of an optical mouse with an aperture stop. The present method comprises the following steps:

1. A light apparatus is provided. The light apparatus comprises at least one image-forming lens and an aperture stop. The image-forming lens defines an interior area and an external area.

2. Light of the light source of the optical mouse is projected onto an image detection surface. The light is reflected from the image detection surface and faces the image-forming lens. Part of the light faces and is transmitted to the interior area of the image-forming lens and another part of the light faces and is transmitted to the external area of the image-forming lens.

3. Part of the light that faces and is transmitted to the interior area of the image-forming lens passes through the aperture stop to an image detection unit and the aperture stop shelter from another part of the light that faces and is transmitted to the external area of the image-forming lens on the front of the image detection unit.

In order to achieve the above object, the present invention provides a light apparatus of an optical mouse with an aperture stop. The light apparatus of an optical mouse with an aperture stop comprises at least one image-forming lens and an aperture stop. The image-forming lens defines a light path, an interior area and an external area. The aperture stop comprises a pupil. The aperture stop is located in the light path of the image-forming lens and shelters the external area of the image-forming lens. The pupil of the aperture stop corresponds to the interior area. The light of the light source of the optical mouse is projected onto an image detection surface, is reflected from the image detection surface, and faces the image-forming lens. Part of the light faces and is transmitted to the interior area of the image-forming lens, and passes through the pupil of the aperture stop to an image detection unit. Another part of the light faces and is transmitted to the external area of the image-forming lens, and is sheltered on the front of the image detection unit by the aperture stop.

Because the aperture stop is located in the light path of the image-forming lens, a light halo is not produced on the image detection unit of the optical mouse when the light source of the optical mouse projects a light and passes through the image-forming lens of the light apparatus. Therefore, the image detection unit clearly detects the image of the image detection surface. The assembly of the image-forming lens and the aperture stop is simple and the cost of the light apparatus is reduced.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
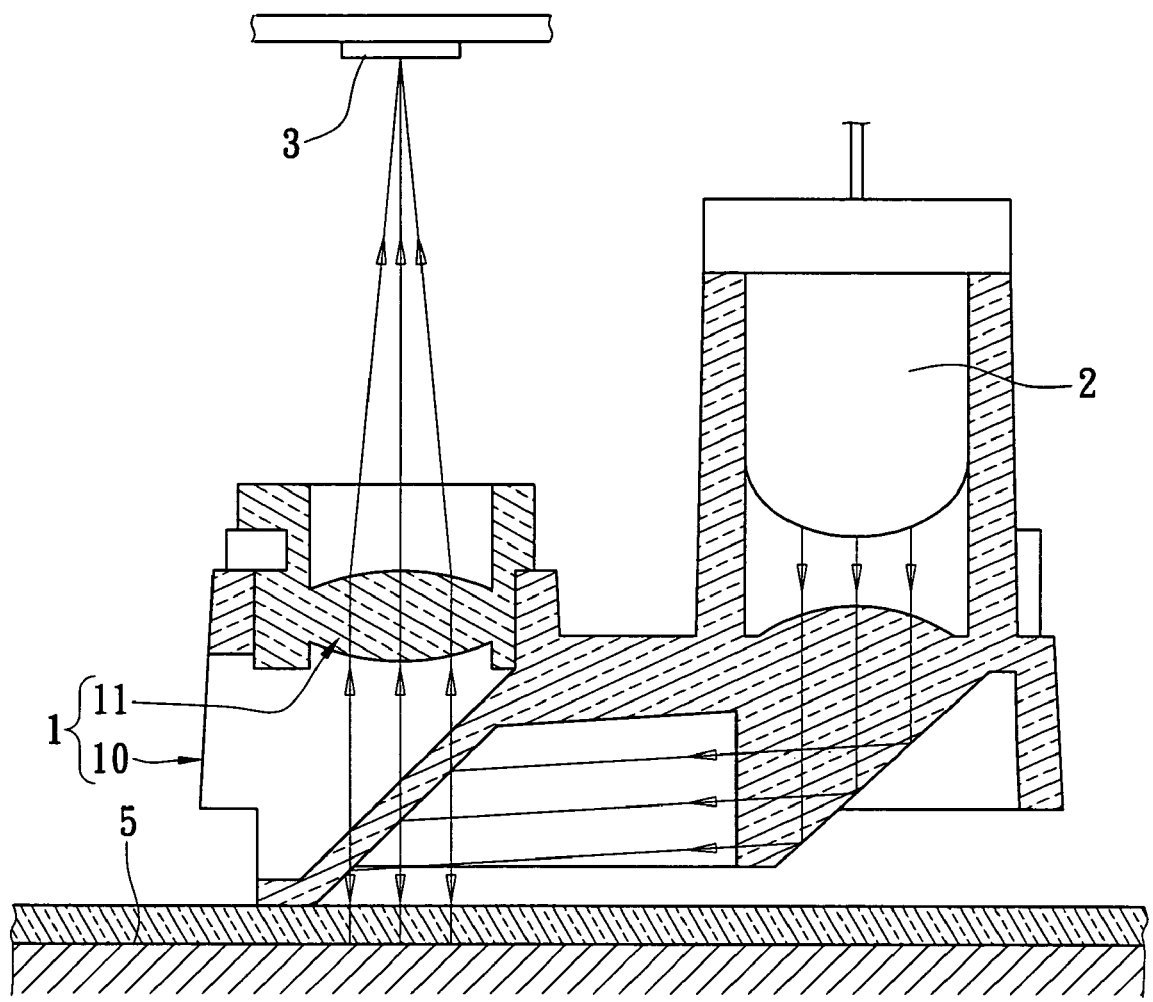
FIG. 1 is a cross-sectional schematic view of the light apparatus of an optical mouse of the prior art.
Figure 1A:
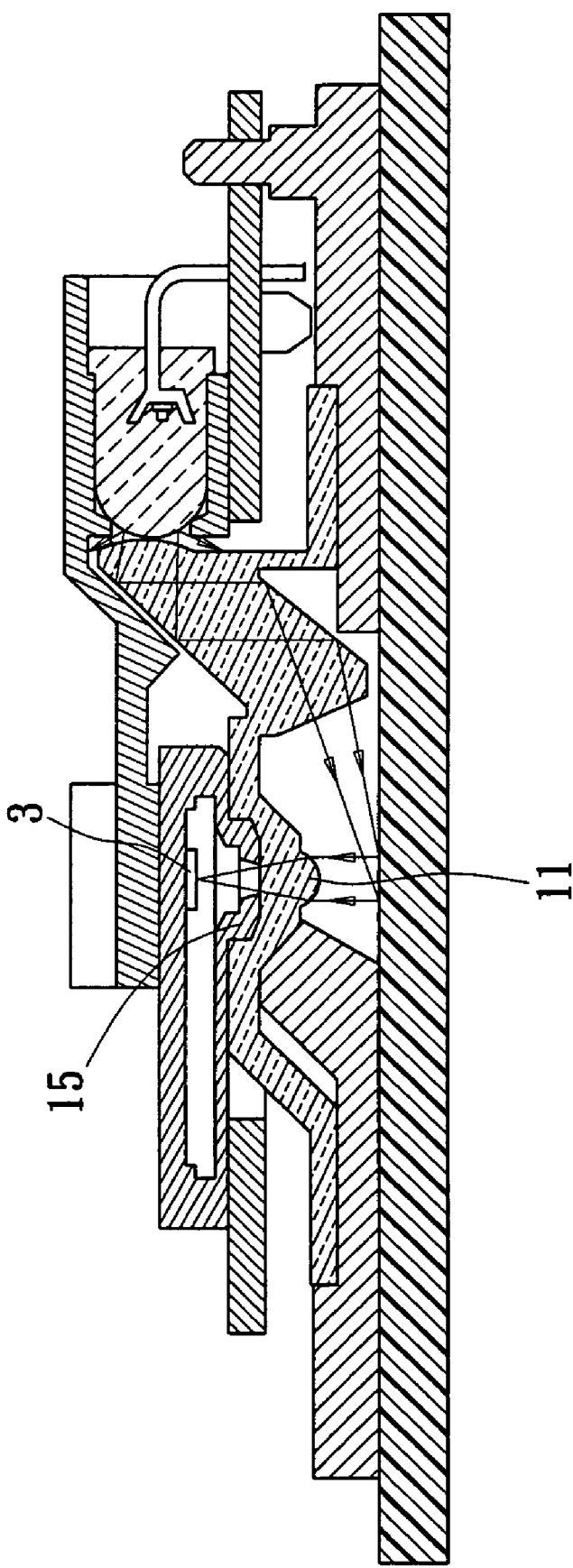
FIG. 1A is a cross-sectional schematic view of the light apparatus of an optical mouse of another prior art.
Figure 2:
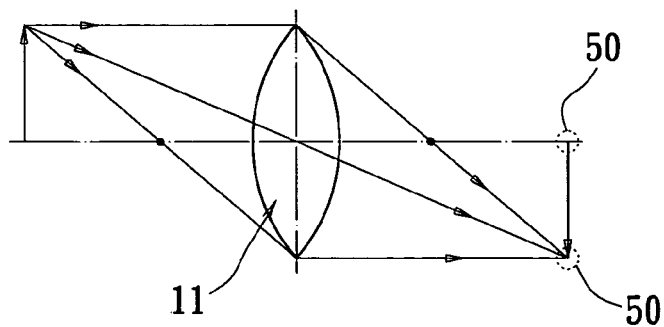
FIG. 2 is a cross-sectional schematic view of the image formed by a lens of the light apparatus of an optical mouse of the prior art.
Figure 4:
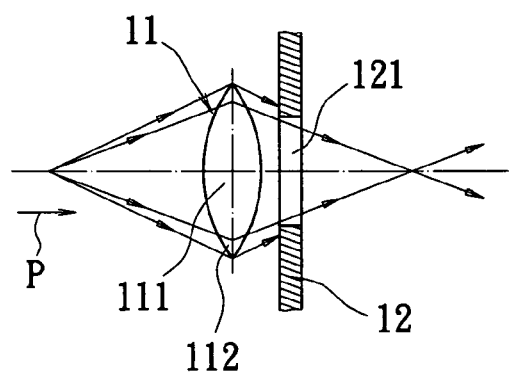
FIG. 4 is a cross-sectional schematic view of the image formed by a lens of the first embodiment of a light apparatus of an optical mouse with an aperture stop of the present invention.
Figure 3:
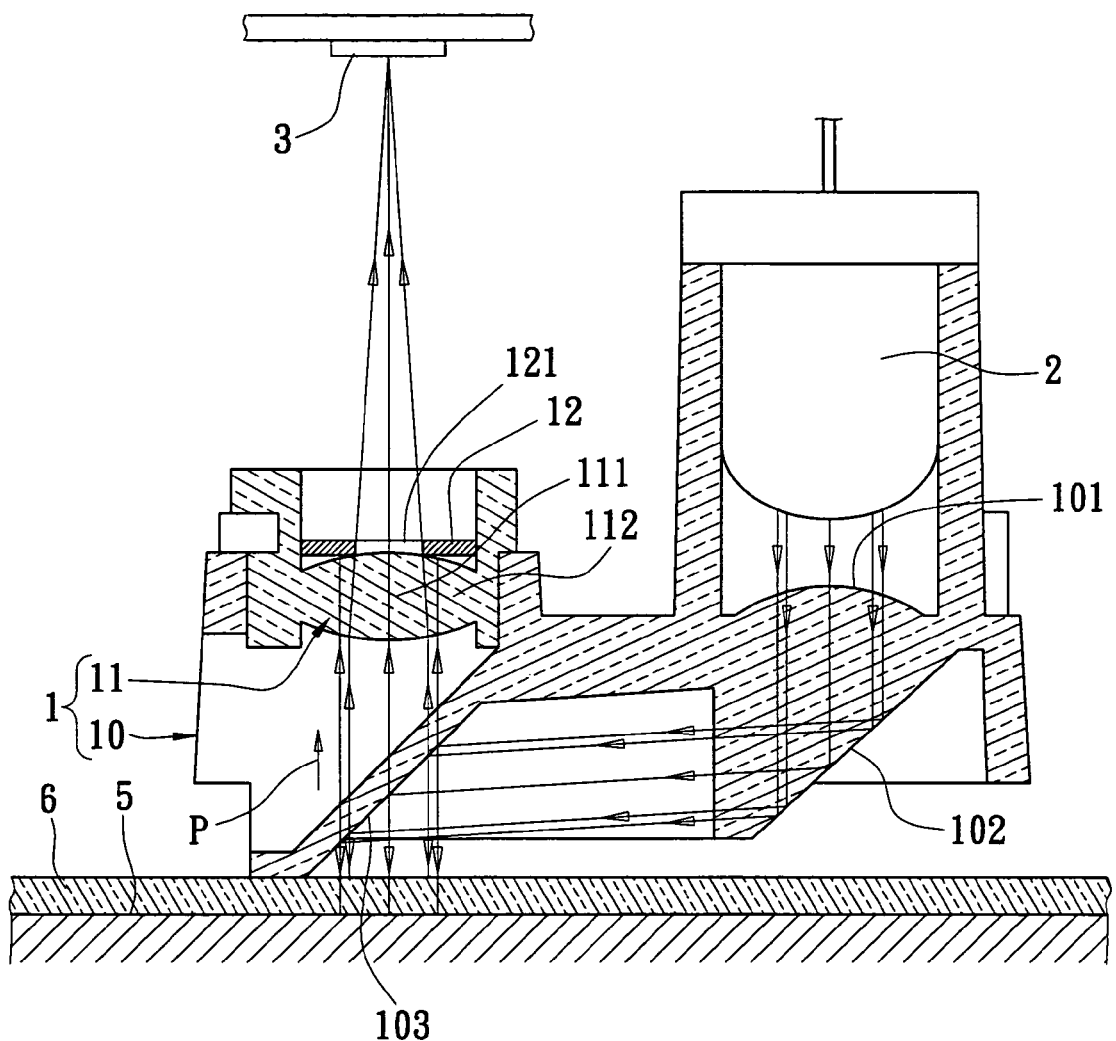
FIG. 3 is a cross-sectional schematic view of the first embodiment of a light apparatus of an optical mouse with an aperture stop of the present invention.

Reference is made to FIG. 3 and FIG. 4, which show the first embodiment of a light apparatus of an optical mouse with an aperture stop of the present invention. The present invention discloses a light apparatus of an optical mouse with an aperture stop and the light projection method thereof. The optical mouse comprises a light apparatus 1, a light source 2 and an image detection unit 3.

The light projection method of a light apparatus of an optical mouse with an aperture stop of the present invention comprises the following steps:

1. A light apparatus 1 is provided. The light apparatus 1 comprises a light-guiding body 10, at least one image-forming lens 11 and an aperture stop 12.

In this embodiment, the light-guiding body 10 comprises a convex lens surface 101, a reflection surface 102 and a light-splitting surface 103. The reflection surface 102 corresponds to the convex lens surface 101, and the light-splitting surface 103 corresponds to the reflection surface 102. The light projected onto the splitting surface 103 is reflected from the splitting surface 103 or passes through the splitting surface 103. The light-guiding body 10 can be another structure, and is not limited to the above structure.

The image-forming lens 11 is made integrally in one piece with the light-guiding body 10 or is assembled on the light-guiding body 10. The image-forming lens 11 corresponds to the light-splitting surface 103. The image-forming lens 11 defines a light path P, an interior area 111 and an external area 112.

The aperture stop 12 comprises a pupil 121. The aperture stop 12 is located in the light path P of the image-forming lens 11 and shelters the external area 112 of the image-forming lens 12. The pupil 121 of the aperture stop 12 corresponds to the interior area 111 of the image-forming lens 11. The aperture stop 12 is located within the focal distance, on the focus point, or out of the focal distance.

2. Light of the light source 2 of the optical mouse is projected onto an image detection surface 5. The light is reflected from the image detection surface 5 and faces the image-forming lens 11. Part of the light faces and is transmitted to the interior area 111 of the image-forming lens 11 and another part of the light faces and is transmitted to the external area 112 of the image-forming lens 11.

Reference is made to FIG. 3. The light-splitting surface 103 faces the image detection surface 5. A transparent medium 6, such as a glass, is disposed on the image detection surface 5. The light of the light source 2 passes through the convex lens 101 and enters into the light-guiding body 10. The light is reflected from the reflection surface 102 to the light-splitting surface 103 and is reflected from the light-splitting surface 103 and vertically transmitted to the transparent medium 6. Then, the light passes through the transparent medium 6 and is projected onto the image detection surface 5. The light is reflected from the image detection surface 5, passes through the light-splitting surface 103 and faces and is transmitted to the image-forming lens 11.

3. Part of the light that faces and is transmitted to the interior area 111 of the image-forming lens 11 passes through the aperture stop 12 to an image detection unit 3 and the aperture stop 12 shelter from another part of the light that faces and is transmitted to the external area 112 of the image-forming lens 11 on the front of the image detection unit 3.

Referring to FIG. 3 and FIG. 4, part of the light faces and is transmitted to the interior area 111 of the image-forming lens 11 and passes through the pupil 121 of the aperture stop 12 to an image detection unit 3. Another part of the light faces and is transmitted to the external area 112 of the image-forming lens 11 and is sheltered on the front of the image detection unit 3 by the aperture stop 12. In the first embodiment, the aperture stop 12 is located between the image-forming lens 11 and the image detection unit 3. This means the aperture stop 12 is located behind the image-forming lens 11 and is fixed on the image-forming lens 11. Therefore, part, of the light that faces the interior area 111 of the image-forming lens 11 first passes through the image-forming lens 11, and then passes through the pupil 121 of the aperture stop 12 to an image detection unit 3.

Figure 10:
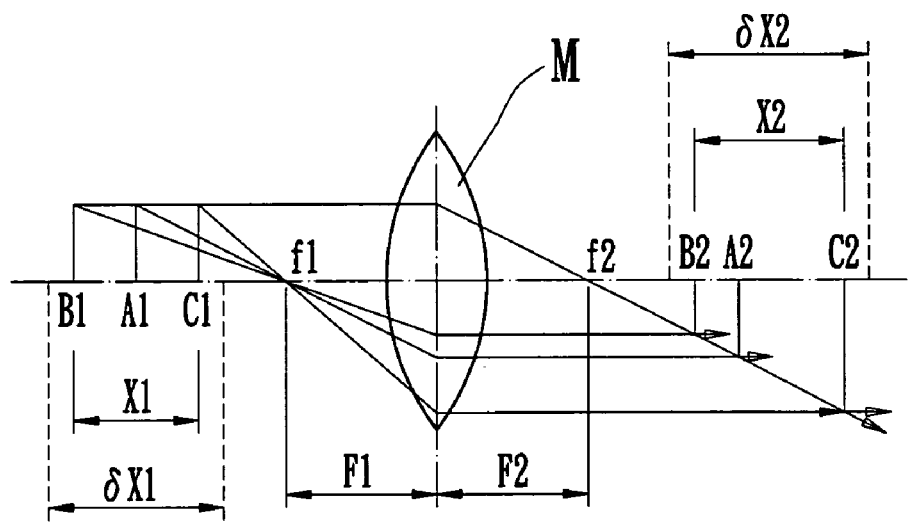
FIG. 10 is a schematic view of the optical principle.

Reference is made to FIG. 10, which shows a schematic view of the optical principle. The light reflected from the location of an object A1 (means the location of the image detection surface 5 of the present invention) passes through an image-forming lens M and forms an image on the location of the image forming A2 (means the location of the image detection unit 3 of the present invention). The light reflected from a location of an object B1 that is far away from the image-forming lens M passes through the image-forming lens M and forms an image on the location of the image forming B2. The location of the image forming B2 is closer to the image-forming lens M than the location of the image forming A2. Therefore, the circle-spot image with a light halo is produced on the location of the image forming B2. The light reflected from a location of an object C1 that is closer to the image-forming lens M passes through the image-forming lens M and forms an image on the location of the image forming C2. The location of the image forming C2 is farther away from the image-forming lens M than the location of the image forming A2. The circle-spot image with a light halo is produced on the location of the image forming A2. When the size of the circle-spot image is smaller than the detection ability of the image detection unit 3, the detection of the image detection unit 3 is sensitive. In contrast, when the size of the circle-spot image is larger than the detection ability of the image detection unit 3, the detection of the image detection unit 3 is insensitive.

When the relative position between the location of an object A1, the image-forming lens M and the location of the image forming A2, the distance between the location of an object B1 and the location of an object C1 is defined as a displacement range of an object before changing X1, the distance between the location of the image forming B2 and the location of the image forming C2 is defined as a displacement range of an image before changing X2. When the locations of an object B1 and the location of an object C1 are changed, the distance between the location of an object B1 and the location of an object C1 is defined as a displacement range of an object after changing δX1. The distance between the location of the image forming B2 and the location of the image forming C2 is defined as a displacement range of an image after changing δX2. When (δX2/δX1) gets smaller, X2 becomes larger. According to the Newtonian formula, when the focal distance of the object side F1 (the distance between the focus point of the object f1 and, the image-forming lens M) is equal to the focal distance of the image side F2 (the distance between the focus point of the image f2 and the image-forming lens M), which means F1=F2=F, $\delta X2/\delta X1=-F^2/X1^2$. Therefore, when the focal distance is fixed and X1 becomes smaller, X2 becomes larger.

When the object distance (the distance between the location of an object A1 and the image-forming lens M) is larger than the focal distance F1, the image plate of the image forming is near the plate of the location of the image forming A2. When the pupil of the aperture stop becomes smaller, the light passing through the image-forming lens M becomes narrow. The light reflected from a location of object with a fixed distance (such as the location of an object B1 or the location of an object C1) forms an image with a circle-spot, the size of the image becomes smaller and the displacement range of an image before changing X2 becomes larger.

In the first embodiment, because the aperture stop 12 shelters the external area 112 of the image-forming lens 11, another part of the light facing the external area 112 can't reach the image detection unit 3. Consequently, no light halo is produced on the image detection unit 3. The image detection unit 3 clearly detects the image of the image detection surface 5 and the direction and the displacement of the movement of the optical mouse can be calculated via a circuit unit of the optical mouse (not shown in the diagram). The sensitivity of the cursor displayed on a display unit will be substantially enhanced.

Figure 6:
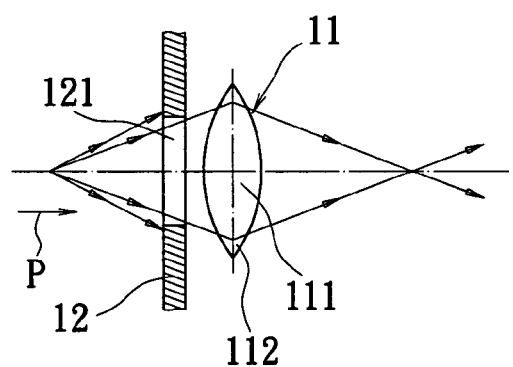
FIG. 6 is a cross-sectional schematic view of the image formed by a lens of the second embodiment of a light apparatus of an optical mouse with an aperture stop of the present invention.
Figure 5:
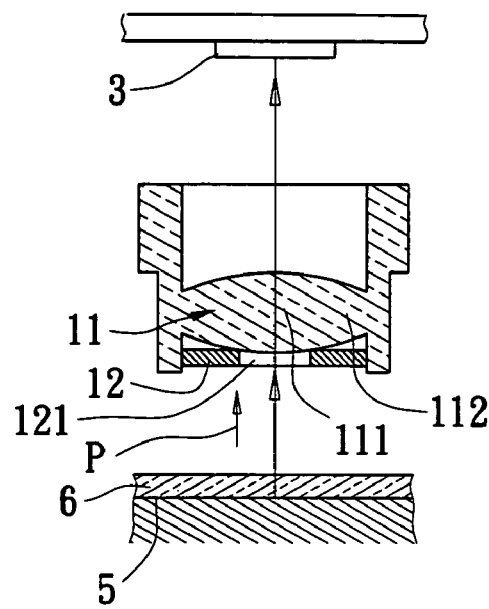
FIG. 5 is a cross-sectional schematic view of the second embodiment of a light apparatus of an optical mouse with an aperture stop of the present invention.

Reference is made to FIG. 5 and FIG. 6, which show the second embodiment of a light apparatus of an optical mouse with an aperture stop of the present invention. The aperture stop 12 is located between the image-forming lens 11 and the image detection surface 5. That means the aperture stop 12 is located before the image-forming lens 11 and is fixed on the image-forming lens 11. Therefore, part of the light facing the interior area 111 of the image-forming lens 11 first passes through the pupil 121 of the aperture stop 12 a, and then passes through the image-forming lens 11 to an image detection unit 3. The above method implements the function of the present invention.

Figure 8:
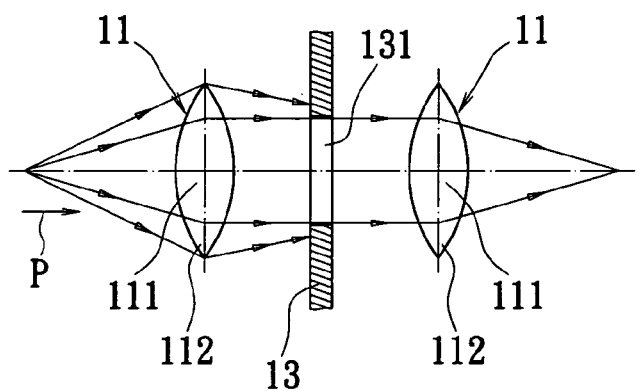
FIG. 8 is a cross-sectional schematic view of the image formed by a lens of the third embodiment of a light apparatus of an optical mouse with an aperture stop of the present invention.
Figure 7:
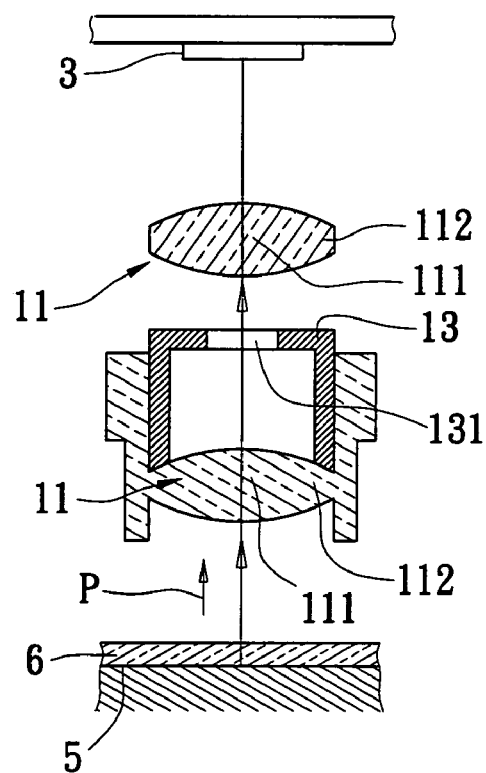
FIG. 7 is a cross-sectional schematic view of the third embodiment of a light apparatus of an optical mouse with an aperture stop of the present invention.

Reference is made to FIG. 7 and FIG. 8, which show the third embodiment of a light apparatus of an optical mouse with an aperture stop of the present invention. The quantity of the image-forming lens 11 is two or more. The aperture stop 13 is located between the two or more image-forming lens 11. The pupil 131 of the aperture stop 13 corresponds to the interior area 111 of the two or more image-forming lens 11. The above method implements the function of the present invention.

Referring to FIG. 3, FIG. 5 and FIG. 7, the aperture stops 12, 13 can be made by a sheltering material or a reflecting material, such as a metal piece, a plastic piece, a rubber piece or a paper piece. The aperture stops 12, 13 are assembled to the image-forming lens 11 by tightening or pasting, or are made integrally in one piece with the image-forming lens 11 by an injection method or an ultrasonic method. The pupil 121 of the aperture stop 12 aligns to the center point of the image-forming lens 11, or is located to one side of the center point of the image-forming lens 11.

Figure 9:
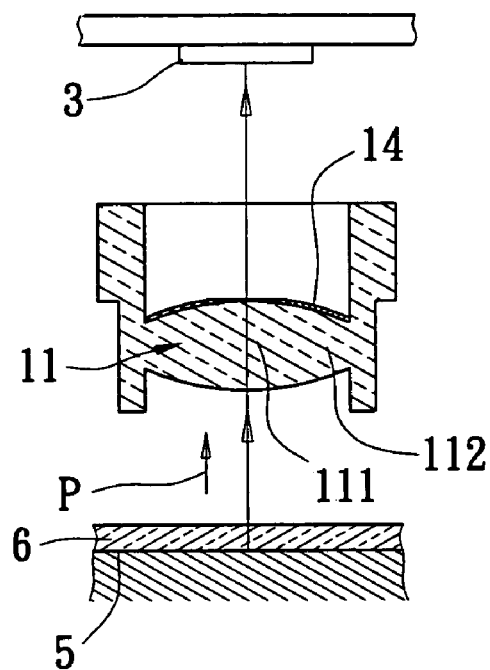
FIG. 9 is a cross-sectional schematic view of the fourth embodiment of a light apparatus of an optical mouse with an aperture stop of the present invention.

Reference is made to FIG. 9, which shows the fourth embodiment of a light apparatus of an optical mouse with an aperture stop of the present invention. The aperture stop 14 is a thin film made of a material that will not corrode the image-forming lens 11. The aperture stop 14 is attached to the surface of the image-forming lens 11 by coating. The above method implements the function of the present invention.

The light apparatus of an optical mouse with an aperture stop and the light projection method thereof of the present invention have following characteristics:

1. The aperture stop is located in the light path of the image-forming lens. A light halo on the image detection unit of the optical mouse is not produced when the light source of the optical mouse projects a light that passes through the image-forming lens of the light apparatus. Therefore, the image detection unit clearly detects the image of the image detection surface.

2. The assembly of the image-forming lens and the aperture stop is simple and can be applied to the image-forming lens with different curvature rates to reduce the cost of the light apparatus.

3. The location the aperture stop can is located in the front side of the image-forming lens (means between the image-forming lens and the image detection unit) or the backside of the image-forming lens (means between the image-forming lens and the image detection surface) according to the design of the optical mouse.

4. The location the aperture stop can is located within the focal distance, on a focal point, or out of the focal distance of the image-forming lens according to the design of the optical mouse.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A light projection method for a light apparatus of an optical mouse with an aperture stop, the method comprising:
providing a light apparatus, wherein the light apparatus comprises at least two image-forming lenses and an aperture stop, and each image-forming lens has an interior area and an external area, the aperture stop including a pupil corresponding to the interior area of the at least two image-forming lenses, the at least two image-forming lenses define a light path, the aperture stop being located in the light path and between the at least two image-forming lenses and sheltering the external area of the at least two image-forming lenses;

wherein light from the image detection surface faces a first of the image-forming lenses, part of the light faces and is transmitted to the interior area of the first image-forming lens, and another part of the light faces and is transmitted to the external area of the first image-forming lens; and passing part of the light facing and transmitted to the interior area of the first image-forming lens through the aperture stop to an image detection unit through a second of the image-forming lenses, the aperture stop sheltering the second image-forming lens from the other part of the light that faces and is transmitted to the external area of the first image-forming lens on a front of the image detection unit.

2. The light projection method for a light apparatus of an optical mouse with an aperture stop of claim 1, wherein the aperture stop is located between the second image-forming lens and the image detection unit.

3. The light projection method for a light apparatus of an optical mouse with an aperture stop of claim 1, wherein the aperture stop is located between the first image-forming lens and the image detection surface.

4. The light projection method for a light apparatus of an optical mouse with an aperture stop of claim 1, wherein the aperture stop is assembled on the first image-forming lens.

5. The light projection method for a light apparatus of an optical mouse with an aperture stop of claim 1, wherein the aperture stop is made integrally in one piece with the first image-forming lens.

6. The light projection method for a light apparatus of an optical mouse with an aperture stop of claim 1, wherein the aperture stop is attached to a surface of the first image-forming lens.

7. The light projection method for a light apparatus of an optical mouse with an aperture stop of claim 1, wherein part of the light facing the interior area of the first image-forming lens first passes through the first image-forming lens, and then passes through the pupil of the aperture stop to the second image-forming lens and an image detection unit.

8. A light projection method for a light apparatus of an optical mouse with an aperture stop, the method comprising:

providing a light apparatus, wherein the light apparatus comprises at least one image-forming lens and an aperture stop, and the image-forming lens defines an interior area and an external area, the aperture stop including a pupil corresponding to the interior area of the at least one image-forming lens, the at least one image-forming lens defining a light path, the aperture stop being located in the light path and shelters the external area of the at least one image-forming lens;

projecting light from a light source of the optical mouse onto an image detection surface, wherein the light is reflected from the image detection surface and faces the image-forming lens, part of the light faces and is transmitted to the interior area of the image-forming lens, and another part of the light faces and is transmitted to the external area of the image-forming lens; and passing part of the light facing and transmitted to the interior area of the image-forming lens through the aperture stop and the aperture stop sheltering from another part of the light that faces and is transmitted to the external area of the image-forming lens;

wherein part of the light facing the interior area of the image-forming lens first passes through the pupil of the aperture stop, and then passes through the image-forming lens to an image detection unit.

9. A light apparatus of an optical mouse with an aperture stop, comprising:

at least two image-forming lens defining a light path, each image-forming lens having an interior area and an external area; and an aperture stop having a pupil corresponding to the interior area of the at least two image-forming lenses, wherein the aperture stop is located between and in the light path of the at least two image-forming lens and shelters the external area of the at least two image-forming lenses;

wherein light from the image detection surface faces a first of the at least two image-forming lenses, part of the light faces and is transmitted to the interior area of the first image-forming lens and passes through the pupil of the aperture stop to an image detection unit through a second of the image-forming lenses, and another part of the light faces and is transmitted to the external area of the first image-forming lens and the second image-forming lens is sheltered from the other part of the light by the aperture stop.

10. The light apparatus of an optical mouse with an aperture stop of claim 9, wherein the aperture stop is located between the second image-forming lens and the image detection unit and is fixed on the image-forming lens.

11. The light apparatus of an optical mouse with an aperture stop of claim 9, wherein the aperture stop is located between the first image-forming lens and the image detection surface and is fixed on the first image-forming lens.

12. The light apparatus of an optical mouse with an aperture stop of claim 9, wherein the aperture stop is assembled on the first image-forming lens.

13. The light apparatus of an optical mouse with an aperture stop of claim 9, wherein the aperture stop is made integrally in one piece with the first image-forming lens.

14. The light apparatus of an optical mouse with an aperture stop of claim 9, wherein the aperture stop is attached to a surface of the first image-forming lens.

15. The light apparatus of an optical mouse with an aperture stop of claim 9, wherein the aperture stop is made by a sheltering material or a reflecting material.

* * * * *